(12) United States Patent
Su et al.

(10) Patent No.: US 12,165,378 B2
(45) Date of Patent: Dec. 10, 2024

(54) METHODS AND SYSTEMS FOR OBJECT DETECTION

(71) Applicant: Aptiv Technologies AG, Schaffhausen (CH)

(72) Inventors: Yu Su, Wuppertal (DE); Markus Schoeler, Remscheid (DE)

(73) Assignee: APTIV TECHNOLOGIES AG, Schaffhausen (CH)

( * ) Notice: Subject to any disclaimer, the term of this patent is extended or adjusted under 35 U.S.C. 154(b) by 404 days.

(21) Appl. No.: 17/653,208

(22) Filed: Mar. 2, 2022

(65) Prior Publication Data

US 2022/0292806 A1 Sep. 15, 2022

(30) Foreign Application Priority Data

Mar. 10, 2021 (EP) ..................................... 21161677

(51) Int. Cl.
*G06V 10/40* (2022.01)
*G01S 17/86* (2020.01)
(Continued)

(52) U.S. Cl.
CPC .............. *G06V 10/40* (2022.01); *G01S 17/86* (2020.01); *G01S 17/931* (2020.01); *G06N 3/04* (2013.01);
(Continued)

(58) Field of Classification Search
CPC ........ G06V 10/40; G06V 10/82; G06V 20/56; G06V 2201/07; G06V 20/58; G01S 17/86;
(Continued)

(56) References Cited

U.S. PATENT DOCUMENTS

2018/0260956 A1* 9/2018 Huang ................... G06V 20/56
2020/0175313 A1 6/2020 Jang
(Continued)

FOREIGN PATENT DOCUMENTS

CN 108062756 B 4/2020
CN 111046734 A 4/2020
(Continued)

OTHER PUBLICATIONS

"Extended European Search Report", EP Application No. 21161677.6, Sep. 9, 2021, 10 pages.
(Continued)

*Primary Examiner* — Ming Y Hon
(74) *Attorney, Agent, or Firm* — Harness, Dickey & Pierce, P.L.C.

(57) ABSTRACT

A computer implemented method for object detection the following steps carried out by computer hardware components: determining an output of a first pooling layer based on input data; determining an output of a dilated convolution layer, provided directly after the first pooling layer, based on the output of the first pooling layer; determining an output of a second pooling layer, provided directly after the dilated convolution layer, based on the output of the dilated convolution layer; and carrying out the object detection based on at least the output of the dilated convolution layer or the output of the second pooling layer.

16 Claims, 4 Drawing Sheets

(51) Int. Cl.
  *G01S 17/931*  (2020.01)
  *G06N 3/04*  (2023.01)
  *G06V 10/82*  (2022.01)
  *G06V 20/56*  (2022.01)
(52) U.S. Cl.
  CPC .............. *G06V 10/82* (2022.01); *G06V 20/56* (2022.01); *G06V 2201/07* (2022.01)
(58) Field of Classification Search
  CPC ................. G01S 17/931; G01S 7/417; G01S 2013/9323; G01S 7/4802; G06N 3/04; G06N 3/08; G06F 18/24133
  See application file for complete search history.

(56) References Cited

U.S. PATENT DOCUMENTS

| | | | | |
|---|---|---|---|---|
| 2022/0067408 A1* | 3/2022 | Sheu | ........................ | G06T 11/20 |
| 2022/0130134 A1* | 4/2022 | Jansen | ................... | G06V 40/15 |
| 2022/0198258 A1* | 6/2022 | Doggett | .................. | G06N 3/08 |
| 2023/0232080 A1* | 7/2023 | Kim | ...................... | G06T 19/006 |
| | | | | 382/155 |
| 2024/0005649 A1* | 1/2024 | Yao | .......................... | G06N 3/08 |

FOREIGN PATENT DOCUMENTS

| | | |
|---|---|---|
| CN | 111798436 A | 10/2020 |
| CN | 112464930 A | 3/2021 |
| WO | 2020156028 A1 | 8/2020 |

OTHER PUBLICATIONS

Sherrah, et al., "Fully Convolutional Networks for Dense Semantic Labelling of High-Resolution Aerial Imagery", Jun. 9, 2016, 22 pages.

Zhao, et al., "Pyramid Scene Parsing Network", Apr. 27, 2017, 11 pages.

* cited by examiner

METHODS AND SYSTEMS FOR OBJECT DETECTION

CROSS-REFERENCE TO RELATED APPLICATIONS

This application claims priority to European Patent Application Number 21161677.6, filed Mar. 10, 2021, the disclosure of which is hereby incorporated by reference in its entirety herein.

BACKGROUND

Various sensors, such as cameras, radar sensors or LIDAR sensors, may be used in automotive applications to monitor the environment of a vehicle. Driver assistant systems may make use of data captured from the sensors, for example by analyzing the data to detect objects. For object detection, convolutional neural networks (CNN) may be used. However, object detection may be a cumbersome task.

Accordingly, there is a need to provide methods and systems for object detection that lead to efficient and accurate results.

SUMMARY

The present disclosure relates to methods and systems for object detection. The present disclosure provides a computer implemented method, a computer system, a vehicle and a non-transitory computer readable medium according to the independent claims. Embodiments are given in the subclaims, the description and the drawings.

In one aspect, the present disclosure is directed at a computer implemented method for object detection, the method comprising the following steps performed (in other words: carried out) by computer hardware components: determining an output of a first pooling layer based on input data; determining an output of a dilated convolution layer, provided directly after the first pooling layer, based on the output of the first pooling layer; determining an output of a second pooling layer, provided directly after the dilated convolution layer, based on the output of the dilated convolution layer; and carrying out the object detection based on at least the output of the dilated convolution layer or the output of the second pooling layer.

In other words, pooling operations in the first pooling layer are based on the input data to determine the output of the first pooling layer. The input data may be subjected to further layers (for example a further dilated convolution layer) before the pooling operations are carried out. The output of the first pooling layer is the input of the dilated convolution layer. The dilated convolution layer directly follows after the first pooling layer (in other words: no further layer is provided between the first pooling layer and the dilated convolution layer). Dilated convolution operations in the dilated convolution layer determine the output of the dilated convolution layer. The output of the dilated convolution layer is the input of the second pooling layer. The second pooling layer directly follows after the dilated convolution layer (in other words: no further layer is provided between the dilated convolution layer and the second pooling layer). On the other hand, immediately before the second pooling layer, there is the dilated convolution layer, and immediately before the dilated convolution layer, there is the first pooling layer. The object detection is based on at least the output of the dilated convolution layer or the output of the second pooling layer.

It will be understood that one or more layers may be provided between the input data and the first pooling layer. Likewise, one or more other layers may be provided after the second pooling layer.

For example, a structure of a series of dilated convolution layers, each followed by a respective pooling layer, may be provided. For example, an alternating structure of a single dilated convolution layer followed by a respective single pooling layer may be provided.

Object detection may be understood as a combination of image classification and object localization. That means object detection locates the presence and type of objects, such as a car, a bus, a pedestrian, or the like, by drawing a bounding box around each object of interest in the image and assigning them a class label. Input for object detection may be a data set (for example a data set from a radar sensor, or from a lidar sensor, or from a camera, for example, an image) with at least one object. Output of the object detection may be at least one bounding box and a class label for each bounding box, wherein a bounding box may be a rectangular box described by the coordinates of the center point of the box and its width and height, and wherein the class label may be an integer value that is referred to a specific type of object. Object detection is widely used in many fields, for example in self-driving technology by identifying the locations of vehicles, pedestrians, roads, and obstacles, or the like in captured images.

The input data may be captured data from sensors, like a radar sensor, a camera or a LIDAR sensor, or may include data from the system as will be described in detail below.

A convolution layer may perform operations, called convolution operations or convolutions. In the context of a convolutional neural network (CNN), a convolution may be a linear operation that process a multiplication of a set of weights with an input data set. The set of weights may be called a filter or a kernel. The multiplication may be a dot product, which means an element-wise multiplication between the kernel elements and a part of the input data with the same size as the kernel. The multiplications may be summed up and may result in a single value. All single values of all convolutions in a convolution layer may define the output of the convolution layer. The size of the kernel may be determined by the number of weights.

Figure 4:
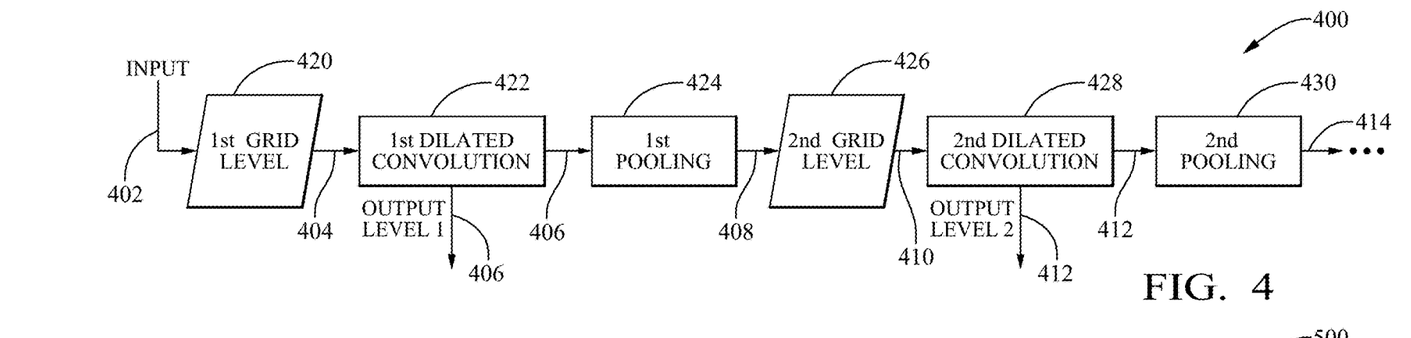
FIG. 4 a combination of dilated convolution and pooling according to various embodiments.

The dilated convolution layer may for example be the second dilated convolution layer 428 as shown in FIG. 4, which consists of the convolution layer, wherein there are free spaces between the kernel elements. In other words, a receptive field of the kernel is increased by adding zero weights between the kernel elements. A detailed description will follow below.

A pooling layer may perform operations which may be referred to as pooling operations or pooling. The pooling layer may aggregate the output of the dilated convolution layer, i.e., focus on the most relevant information, and may reduce the number of parameters needed to detect objects of the given input data. Thus, the output of the pooling layer may be a reduced scope of the output generated by the dilated convolution layer, consisting of the summarized features instead of precisely positioned features. This may result in a better performance and a lower demand of memory.

According to an embodiment, the method further comprises the following steps carried out by the computer hardware components: determining an output of a further dilated convolution layer, provided directly after the second pooling layer, based on the output of the second pooling layer; and determining an output of a further pooling layer, provided directly after the further dilated convolution layer, based on the output of the further dilated convolution layer; wherein the object detection is carried out further based on at least the output of the further dilated convolution layer or the output of the further pooling layer.

In other words, there is a further dilated convolution layer and a further pooling layer, wherein the further dilated convolution layer and the further pooling layer are arranged in such a way that the further dilated convolution layer directly follows the second pooling layer (in other words: no further layer is provided between the second pooling layer and the further dilated convolution layer) and the further pooling layer directly follows the further dilated convolution layer (in other words: no further layer is provided between the further dilated convolution layer and the further pooling layer). The output of the second pooling layer is the input of the further dilated convolution layer, and the output of the further dilated convolution layer is the input of the further pooling layer. The object detection is carried out further based on at least the output of the further dilated convolution layer or the output of the further pooling layer.

According to various embodiments, there may be a plurality of further dilated convolution layers and a plurality of further pooling layers, wherein each one of the further dilated convolution layers is directly followed by a respective one of the further pooling layers, and that combination directly follows the last already existing pooling layer. The object detection may then be carried out further based on at least one of the outputs of the various layers (dilated convolution layers and/or pooling layers).

Each dilated convolution layer may recognize a different feature which may be relevant to a specific task. By the combination of a dilated convolution layer with a pooling layer, the dimension and therefore the number of parameters is reduced.

According to an embodiment, the method further comprises the following steps carried out by the computer hardware components: up-sampling of the output of the dilated convolution layer and the output of the further dilated convolution layer to a pre-determined resolution; and concatenating the output of the dilated convolution layer and the output of the further dilated convolution layer, wherein the object detection is carried out based on the concatenated output.

Up-sampling as used herein may mean increasing the dimension of the output of the dilated convolution layer and the output of the further dilated convolution layer. This may be done for example by repeating the rows and columns of the output of the dilated convolution layer and of the output of the further dilated convolution layer. Another possibility for up-sampling may be a backward convolution layer. The backward convolution layer may perform an inverse convolution operation, i.e., the forward and backward passes of the convolution layer are reversed.

The pre-determined resolution is a resolution of the input data or a resolution of yet a further dilated convolution layer or a further convolution layer provided before the first pooling layer.

Outputs of yet further dilated convolution layers may also be up-sampled and concatenated.

The output of concatenating the output of the dilated convolution layer and the output of the further dilated convolution layer may be referred to as concatenated output.

According to an embodiment a dilation rate of a kernel of the dilated convolution layer may be different from a dilation rate of a kernel of the further dilated convolution layer.

A dilation rate of a kernel may define a spacing between the kernel elements, wherein the spacing is filled with zero elements. A dilation rate of one means that there is no spacing between the kernel elements, thus the kernel elements are positioned next to each other. The size of the kernel with the dilation rate equal or greater than two is increasing by adding zero weights between the kernel elements, so that for example a dilation rate of two may add one zero weight element between the kernel elements, a dilation rate of three may add two zero weight elements between the kernel elements, and so on. Different dilation rates, e.g., 2, 3, 4 or 5, may be used in the method described herein. In another embodiment, at least two different dilation rates among the kernels of the dilated convolution layer, the further dilated convolution layer and/or yet further dilated convolution layer(s) may be provided.

The stride of the kernel (of a respective layer) may define how the kernel or filter is moved across the input data (of the respective layer), e.g., an image, from left to right and top to bottom. Using a higher stride, e.g., 2, 3 or 4, may have the effect of applying a filter in such a way that the output of the dilated convolution layer, the further dilated convolution layer and/or yet further dilated convolution layer(s) is down-sampled, wherein down-sampling may mean decreasing the size of the output. Therefore, increasing the stride may reduce computational time and memory demand. Different strides, e.g., 2, 3 or 4, of the kernel of the dilated convolution layer, the further dilated convolution layer and/or yet further dilated convolution layer(s) may be used in the method described herein.

According to an embodiment, each of the first pooling layer and the second pooling layer comprises either mean pooling or max pooling.

Pooling operations may provide down-sampling of the image obtained from a previous layer, which may be understood as reducing the number of pixels of the image and thus reducing the number of parameters of the convolutional network. Max pooling may be a pooling operation that determines the maximum (in other words: the largest value) in each considered area. Applying max pooling operations for down-sampling may be computationally efficient. Mean pooling or average pooling may determine the average value for each considered area and may thus retain information about possibly less important elements. This may be useful in situations where the position of objects in an image is important.

The further pooling layer and/or yet further pooling layer(s) may also comprise either mean pooling or max pooling.

According to an embodiment, a respective kernel of each of the first pooling layer and the second pooling layer may be of size 2×2, 3×3, 4×4 or 5×5. The kernel of the further pooling layer and/or yet the kernel of further pooling layer(s) may also be of size 2×2, 3×3, 4×4 or 5×5.

Pooling in a small local region may smooth the grid and may therefore reduce artifacts. It has been found that using smaller kernel sizes may lead to lower mistake rates.

It will be understood that reference to a kernel of a layer means the kernel used for the operations of that layer.

According to an embodiment, a respective kernel of each of the first pooling layer and the second pooling layer depends on a size of a kernel of the dilated convolution layer. The kernel of the further pooling layer may also depend on a size of a kernel of the further dilated convolution layer and/or yet the kernel of further pooling layer(s) may also depend on a size of a kernel of further dilated convolution layer(s).

It has been found that performance may be enhanced if the kernel size of the pooling operation, the kernel size of the convolution operation and the number of samples are selected in a respective relationship to each other.

According to an embodiment, the input data comprises a 2D grid with channels. The input data may be detected by a camera, wherein the input data is a two-dimensional image with RGB channels for color information.

According to an embodiment, the input data is determined based on data from a radar system. The input data may also be or may include data from the system.

Radar sensors are impervious to adverse or bad weather conditions, working reliably in dark, wet or even foggy weather. They are able to identify the distance, direction and relative speed of vehicles or hazards.

According to an embodiment, the input data is determined based on at least one of data from at least one of a LIDAR system or data from a camera system. The input data may also be or may include data from the system.

Input data recorded by cameras may be used to detect RGB information, e.g., identify traffic lights, road signs or red brake lights of other vehicles, and having extremely high resolution.

Input data recorded from LIDAR sensors may be very detailed and may include fine and accurate information about objects at a great distance. Ambient lightning may not influence the quality of the captured information by LIDAR, thus the results at day and night may be without any loss of performance due to disturbances such as shadows, sunlight or headlight glare.

According to an embodiment, the object detection is carried out using a detection head. A respective detection head may be provided for each property of the detected object, for example a class of the object, a size of the object, and/or a velocity of the object.

According to an embodiment, the detection head comprises an artificial neural network. The neural network for the detection head may be trained together with a training of the artificial neural network which includes the first pooling layer, the dilated convolution layer, the second pooling layer (and, if applicable, the further pooling layers and further dilated convolution layers).

In another aspect, the present disclosure is directed at a computer system, said computer system being configured to carry out several or all steps of the computer implemented method described herein.

The computer system may comprise a plurality of computer hardware components (for example a processor, for example processing unit or processing network, at least one memory, for example memory unit or memory network, and at least one non-transitory data storage). It will be understood that further computer hardware components may be provided and used for carrying out steps of the computer implemented method in the computer system. The non-transitory data storage and/or the memory unit may comprise a computer program for instructing the computer to perform several or all steps or aspects of the computer implemented method described herein, for example using the processing unit and the at least one memory unit.

In another aspect, the present disclosure is directed at a vehicle, comprising the computer system described herein and a sensor, wherein the input data is determined based on an output of the sensor. The sensor may be a radar system, a camera and/or a LIDAR system.

The vehicle can be a car or truck and the sensor may be mounted on the vehicle. The sensor may be directed to an area in front or in the rear or at a side of the vehicle. Images may be captured by the sensor when the vehicle is moving.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid-state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein.

BRIEF DESCRIPTION OF THE DRAWINGS

Exemplary embodiments and functions of the present disclosure are described herein in conjunction with the following drawings, showing schematically.

DETAILED DESCRIPTION

Convolutional neural networks (CNN) may be used for many perception tasks, e.g., object detection, semantic segmentation. The input data to CNN may be formulated by a 2D grid with channels, e.g., an image with RGB channels taken from camera or a grid quantized from Lidar point cloud. The targets in perception tasks may have different sizes. For example, in autonomous driving scenario, a bus may be much larger than a pedestrian. Besides, in image domain, the scale change may be even larger due to perspective projection. To better identify targets with multiple scales, a pyramid structure with different spatial resolutions may be provided.

Figure 1:
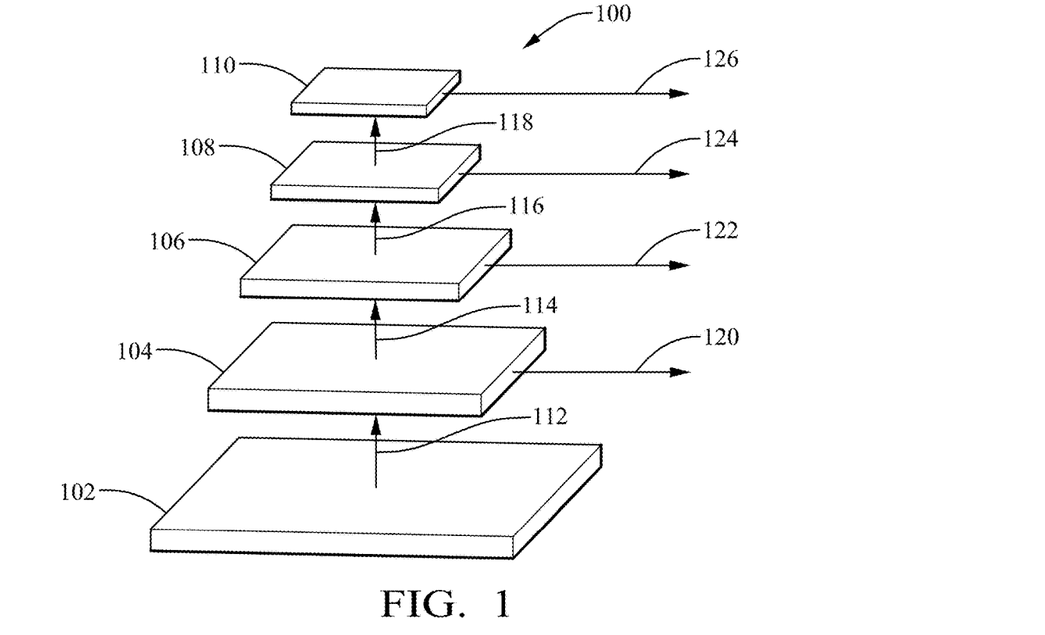
FIG. 1 a feature pyramid structure according to various embodiments.

FIG. 1 shows a feature pyramid structure 100 of a convolutional neural network (CNN). Perception tasks may be performed on every pyramid level (or layer) 102, 104, 106, 108, 110 or a fusion of them.

The pyramid structure starts with a first layer 102 and refines the features at each higher layer 104, 106, 108, 110. In each step between the pyramid layers 112, 114, 116, 118 the spatial resolution decreases. For example, a pooling operation (mean or max pooling) followed by down-sampling may be provided to reduce the spatial resolution of the grid, therefore the convolution on top of it covers a larger region which is also known as receptive field. If the spatial resolution decreases and the size of the receptive field stays the same, the receptive field covers a larger region.

A large receptive field is desirable for CNNs to capture multi-scale targets in spatial context. However, the pooling operation may discard detailed information embedded in local regions. Furthermore, if an up-sampling is performed to recover the spatial resolution, wherein the outputs 120, 122, 124, 126 of the layers 104, 106, 108, 110 are used as inputs, the smearing and smoothing effect may lead to further information loss.

Figure 2:
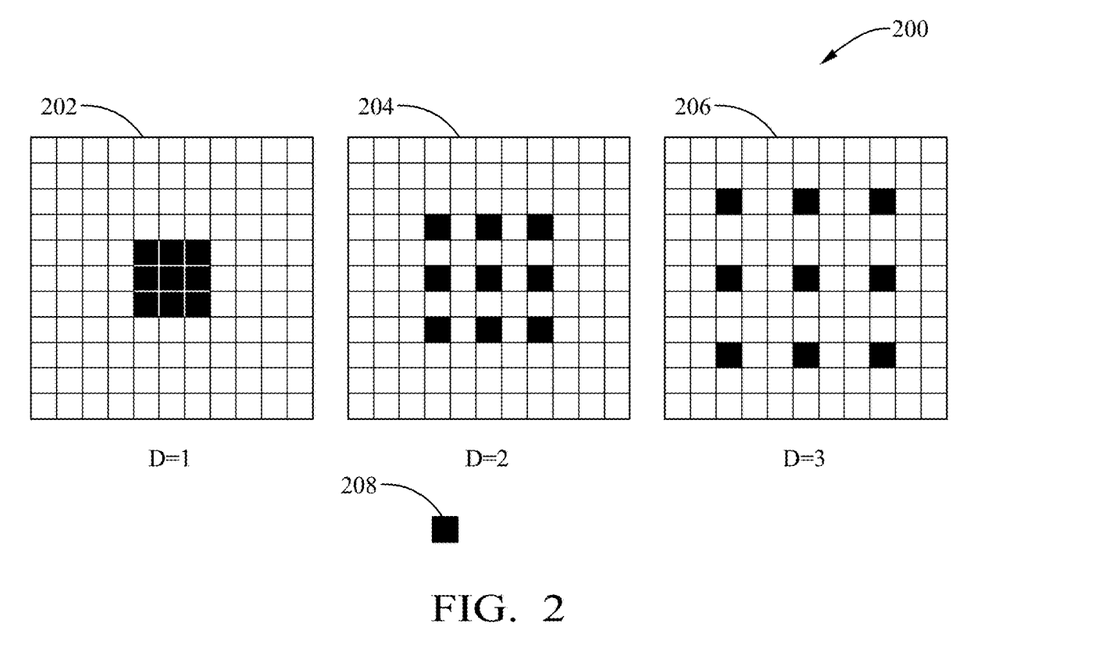
FIG. 2 convolution kernels with different dilation rate according to various embodiments.

Dilated convolution, which means the convolution kernel has a dilation rate of at least two or higher, as illustrated in FIG. 2 may also have the effect of increasing the receptive field, while still capture well the local information.

FIG. 2 shows an illustration 200 of convolution kernels of size 3×3 with different dilation rates. If the dilation rate D is equal to one, the kernel of the dilated convolution may be coincident with a kernel of a normal convolution 202. As dilation rate increases, the space between the original kernel elements 208 expands. For a dilation rate of two (D=2) 204, between each kernel element 208 of the original kernel there is one space left. The kernel size still remains to 3×3, but the receptive field enlarges to the size of 5×5 (instead of 3×3). Accordingly, a dilation rate of three (D=3) 206 implies that between two kernel elements 208 there are two free spaces, and the size of the receptive field grows to 7×7.

However, if multiple dilated convolutions are stacked, especially with same dilation rate, the spatial inconsistence problem, i.e., gridding artifacts, occurs. In this case, the neighboring positions in a grid come from a different set of positions of the precede grid without any overlap. In another word, the adjacent positions are not guaranteed to be smooth anymore.

Figure 3:
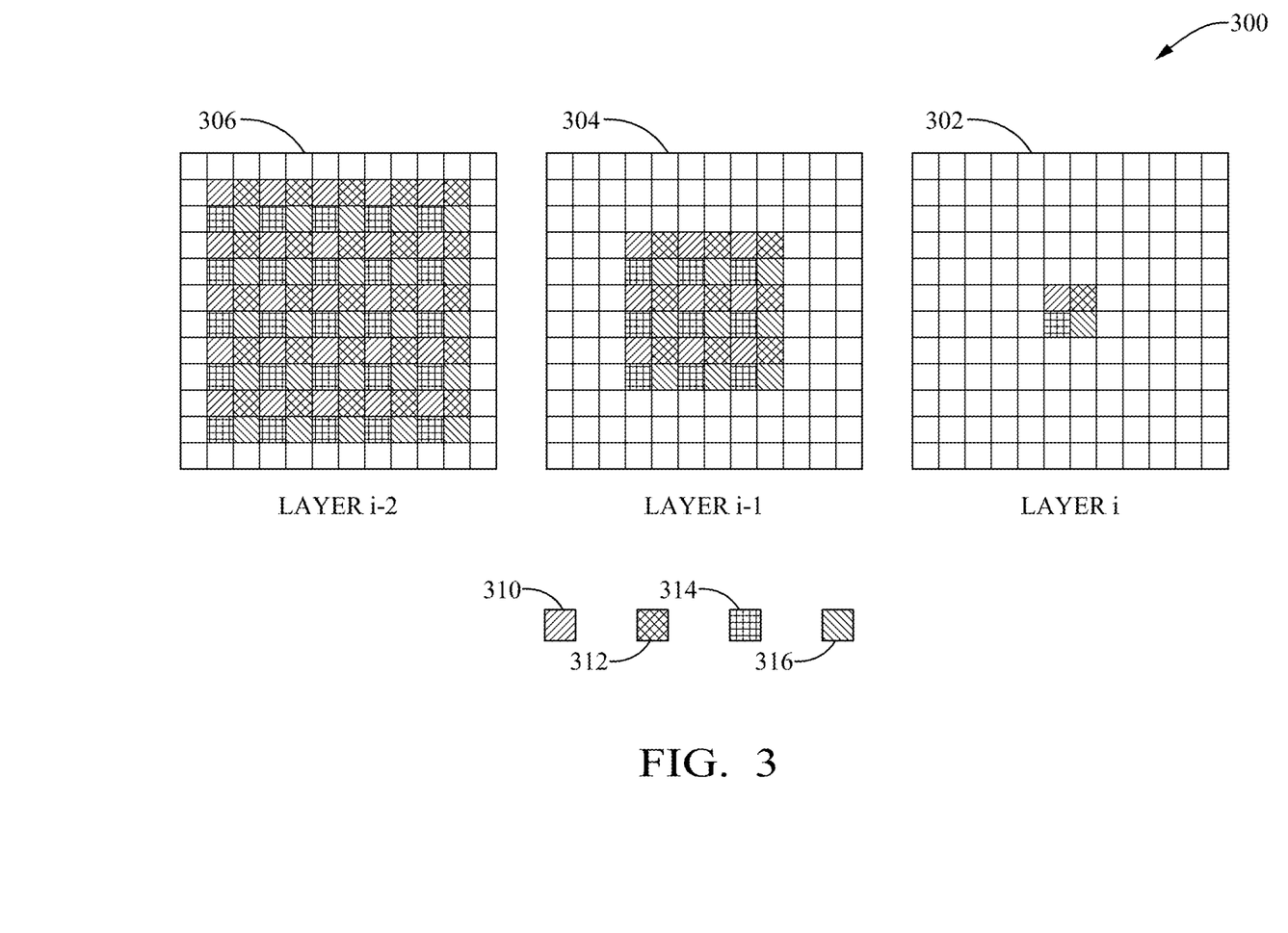
FIG. 3 an illustration of gridding artifacts.

FIG. 3 shows an illustration 300 of the spatial inconsistence problem of gridding artifacts. The operations between layers are both dilated convolutions with a kernel size of 3×3 and a dilation rate of 2. Four neighboring positions 310, 312, 314, 316 in layer i 302 are indicated by different shadings. Their actual receptive fields in layer i-1 304 and layer i-2 306 are marked with the same shading respectively. It will be understood that their actual receptive fields are separate sets of positions.

As mentioned above, pooling and dilated convolution may be used to increase the receptive field. According to various embodiments, pooling and dilated convolution may be combined. It has been found that the gridding artifacts introduced due to stacking of multiple dilated convolutions may be reduced or avoided when a pooling layer is inserted after every dilated convolution layer.

FIG. 4 shows an illustration 400 of a combined structure of dilated convolution and pooling according to various embodiments. The input data 402 may come from a digital device, like a camera, a radar or a LIDAR sensor. The input data 402 may also be or may include data from the system. The first grid level 420 may consist of a 2D grid with channels, like an image with RGB channels. The first dilated convolution layer 422 may extract a feature from the first grid level 420, wherein different dilation rates may be used, e.g., 2, 3, 4 or 5, to expand the receptive field. The input of the first dilated convolution layer 422 is the output 404 of the first grid level 420 which is the same as the input 402. The first dilated convolution layer 422 may be done directly before the first pooling layer 424 to keep the local information at a defined resolution. The first pooling layer 424 may be followed directly after the first dilated convolution layer 422, wherein the input 406 of the first pooling layer 424 is the output 406 of the first dilated convolution layer 422. It is important that the first dilated convolution layer 422 is directly followed by the first pooling layer 424 (without any further layer in between), otherwise the gridding artifacts may be generated.

Pooling operations within the first pooling layer 424 may be executed as mean pooling or max pooling and may be carried out in a small local region, e.g., 2×2, 3×3 or 4×4, to smooth the grid and therefore reduce the artifacts. The output 408 of the first pooling layer 424 may specify the second grid level 426 and may serve as the input 410 of the second dilated convolution layer 428, which directly follows after the first pooling layer 424. Directly after the second dilated convolution layer 428, the second pooling layer 430 is provided, wherein the input 412 of the second pooling layer 430 is the output 412 of the second dilated convolution layer 428. As shown in FIG. 4, outputs 408 and 412 of different spatial resolutions may be provided, while keeping detailed local information at every resolution. Finally, an object detection is carried out, based on at least the output 412 of the second dilated convolution layer 428 or the output 414 of the second pooling layer 430.

The method shown in FIG. 4 may be adopted as backbone of a radar-based object detection network which detects vehicles in autonomous driving scenario. The approach may provide high performance especially by detecting large moving vehicles. This may be due to the larger receptive field given by the combination of dilated convolution and pooling. At the same time, the detailed local information may be kept to provide good detection of stationary vehicles which may rely more on the local spatial structure.

Figure 5:
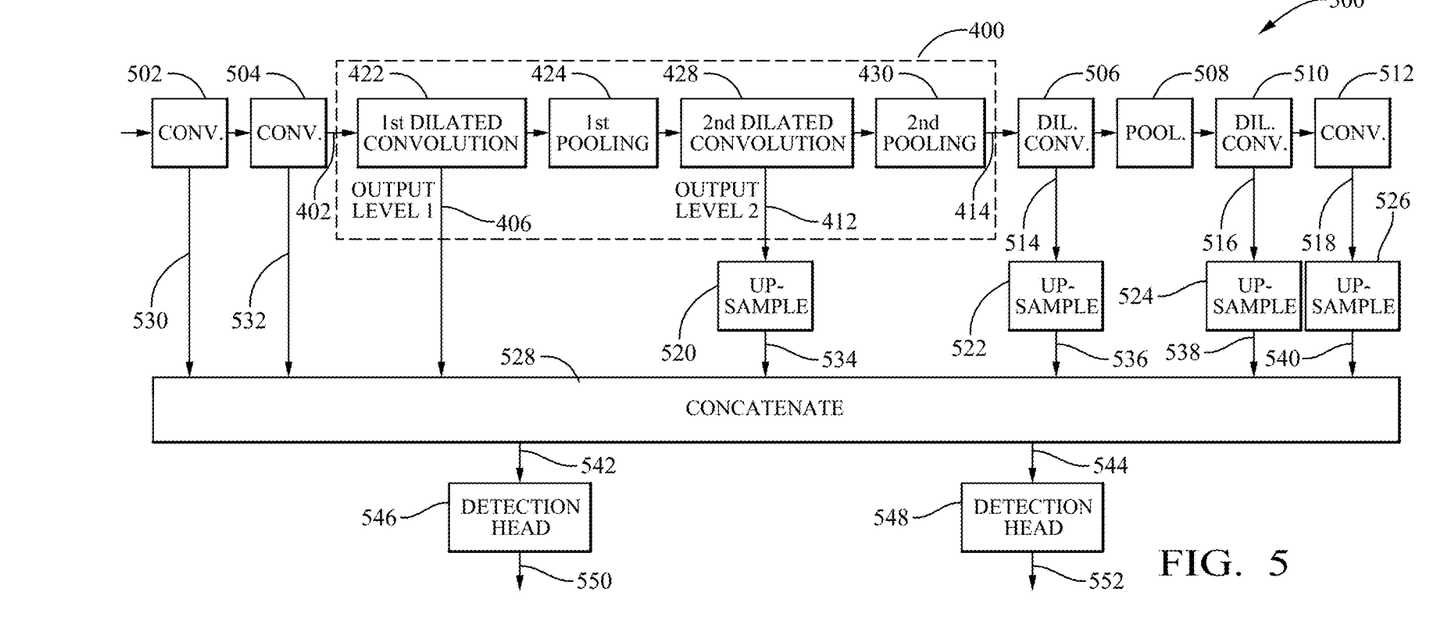
FIG. 5 an embodiment wherein a pattern, comprising the dilated convolution layer and the second pooling layer, alternate multiple times consecutively.

FIG. 5 shows an illustration 500 of alternating application of dilated convolution and pooling according to various embodiments. Various elements shown in FIG. 5 may be similar or identical to elements shown in FIG. 4, so that the same reference signs may be used, and duplicate description may be omitted.

Further convolution layers 502, 504, 512, further dilated convolution layers 506, 510 and a further pooling layer 508 are added to the combined structure of dilated convolution and pooling shown in FIG. 4. Immediately before the first dilated convolution layer 422, a further convolution layer 504, which may be a dilated convolution layer, may be provided. The input data 402 of the first dilated convolution layer 422 may be the output of the further convolution layer 504, thus the input data 402 is data from the (sensor) system. Before the further convolution layer 504, another convolution layer 502, which may be a dilated convolution layer, may be provided. The convolution layer 502 may be directly connected to the further convolution layer 504. The output 414 of the second pooling layer 430 may be the input of the further dilated convolution layer 506, which may directly follow after the second pooling layer 430. Directly after the further dilated convolution layer 506, the further pooling layer 508 may be provided, wherein the input of the further pooling layer 508 may the output of the further dilated convolution layer 506. Directly after the further pooling layer 508, another further dilated convolution layer 510 may be provided, wherein the input of the another further dilated convolution layer 510 may be the output of the further pooling layer 508. Directly after the other further dilated convolution layer 510, another further convolution layer 512, which may be a dilated convolution layer, may be provided. The input of the other further convolution layer 512 may be the output of the another further dilated convolution layer 510. Therefore, a large range of receptive fields may be embedded in multiple level outputs 406, 412,

514, 516, 518, 530, 532. An up-sampling of the outputs 412, 514, 516, 518 of the dilated convolution layer 428, the output of the further dilated convolution layers 506, 510 and the output of the further convolution layer 512 to a pre-determined resolution may be carried out in 520, 522, 524, 526, respectively. The outputs 534, 536, 538, 540 of the up-samples 520, 522, 524, 526 and the output 532 of the further convolution layer 504 and the output 530 of the other further convolution layer 502 may be concatenated in a concatenating block 528. The output 542 of the concatenating block 528 may be the input of a detection head 546 and the output 544 of the concatenating block 528 may be the input of a further detection head 548. The object detection is carried out by using the outputs 550, 552 of the detection heads 546, 548.

In another embodiment, the multiple outputs 406, 412, 514, 516, 518, 530, 532 may directly connected to multiple task-specific detection heads (not shown in the figures).

Figure 6:
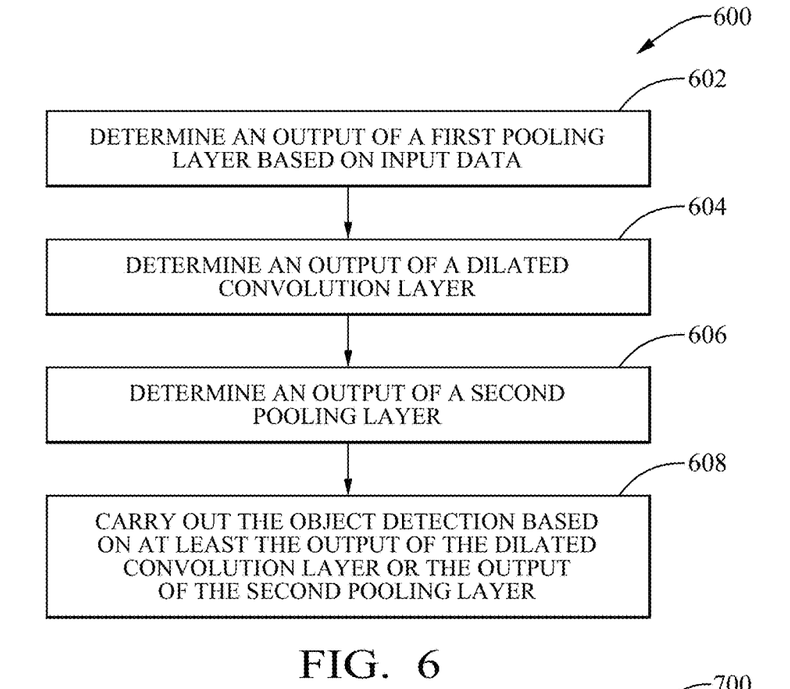
FIG. 6 a flow diagram illustrating a method for object detection according to various embodiments.

FIG. 6 shows a flow diagram 600 illustrating a method for object detection according to various embodiments. At 602, an output of a first pooling layer may be determined based on input data. At 604, an output of a dilated convolution layer, provided directly after the first pooling layer, may be determined based on the output of the first pooling layer. At 606, an output of a second pooling layer, provided directly after the dilated convolution layer, may be determined based on the output of the dilated convolution layer. At 608, the object detection may be carried out based on at least the output of the dilated convolution layer or the output of the second pooling layer.

According to various embodiments, the method may further include: determining an output of a further dilated convolution layer, provided directly after the second pooling layer, based on the output of the second pooling layer; and determining an output of a further pooling layer, provided directly after the further dilated convolution layer, based on the output of the further dilated convolution layer; wherein the object detection is carried out further based on at least the output of the further dilated convolution layer or the output of the further pooling layer.

According to various embodiments, the method may further include: up-sampling the output of the dilated convolution layer and the output of the further dilated convolution layer to a pre-determined resolution; and concatenating the output of the dilated convolution layer and the output of the further dilated convolution layer; wherein the object detection is carried out based on the concatenated output.

According to various embodiments, a dilation rate of a kernel of the dilated convolution layer may be different from a dilation rate of a kernel of the further dilated convolution layer.

According to various embodiments, each of the first pooling layer and the second pooling layer may include or may be either mean pooling or max pooling.

According to various embodiments, a respective kernel of each of the first pooling layer and the second pooling layer may be of size 2×2, 3×3, 4×4 or 5×5.

According to various embodiments, a respective kernel of each of the first pooling layer and the second pooling layer may depend on (or depend on) a size of a kernel of the dilated convolution layer.

According to various embodiments, the input data may include or may be a 2D grid with channels.

According to various embodiments, the input data may be determined based on data from a radar system.

According to various embodiments, the input data may be determined based on at least one of data from at least one of a LIDAR system or data from a camera system.

According to various embodiments, the object detection may be carried out using a detection head.

According to various embodiments, the detection head may include or may be an artificial neural network.

Each of the steps 602, 604, 606, 608 and the further steps described above may be performed by computer hardware components.

With the methods and systems as described herein, object detection based on deep learning may be provided.

Figure 7:
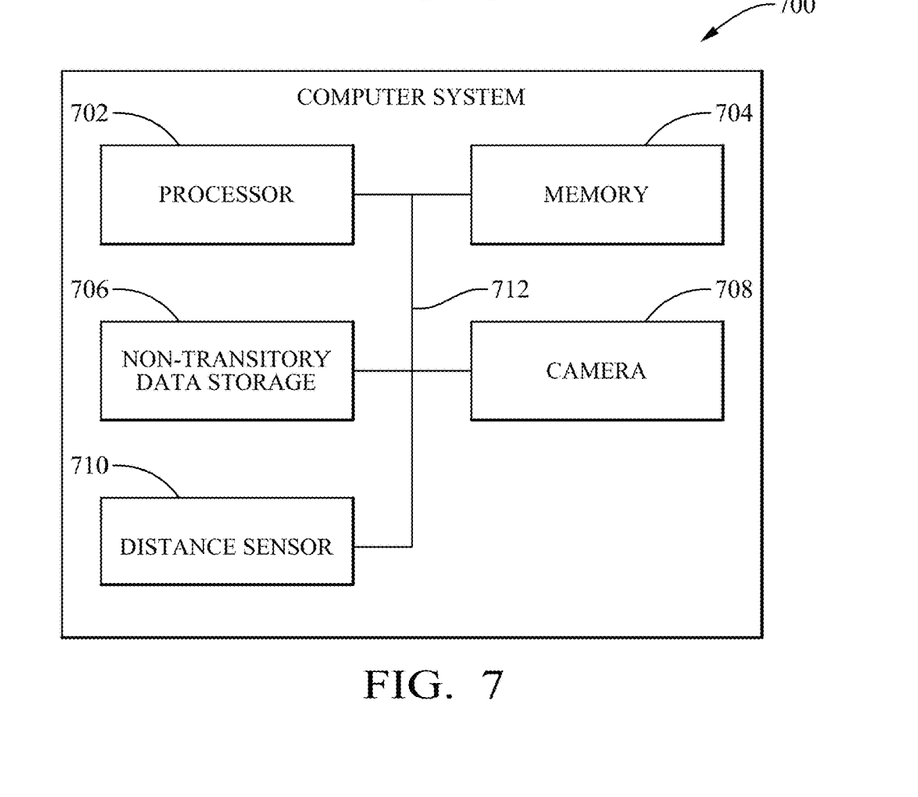
FIG. 7 a computer system with a plurality of computer hardware components configured to carry out steps of a computer implemented method for object detection according to various embodiments.

FIG. 7 shows a computer system 700 with a plurality of computer hardware components configured to carry out steps of a computer implemented method for object detection according to various embodiments. The computer system 700 may include a processor 702, a memory 704, and a non-transitory data storage 706. A camera 708 and/or a distance sensor 710 (for example a radar sensor or a LIDAR sensor) may be provided as part of the computer system 700 (like illustrated in FIG. 7) or may be provided external to the computer system 700.

The processor 702 may carry out instructions provided in the memory 704. The non-transitory data storage 706 may store a computer program, including the instructions that may be transferred to the memory 704 and then executed by the processor 702. The camera 708 and/or the distance sensor 710 may be used to determine input data, for example input data that is provided to a convolution layer or a dilated convolution layer or a pooling layer as described herein.

The processor 702, the memory 704, and the non-transitory data storage 706 may be coupled with each other, e.g., via an electrical connection 712, such as e.g., a cable or a computer bus or via any other suitable electrical connection to exchange electrical signals. The camera 708 and/or the distance sensor 710 may be coupled to the computer system 700, for example via an external interface, or may be provided as parts of the computer system (in other words: internal to the computer system, for example coupled via the electrical connection 712).

The terms "coupling" or "connection" are intended to include a direct "coupling" (for example via a physical link) or direct "connection" as well as an indirect "coupling" or indirect "connection" (for example via a logical link), respectively.

It will be understood that what has been described for one of the methods above may analogously hold true for the computer system 700.

What is claimed is:
1. A method comprising,
   determining an output of a first pooling layer based on input data;
   determining an output of a dilated convolution layer, provided directly after the first pooling layer, based on the output of the first pooling layer;
   determining an output of a second pooling layer, provided directly after the dilated convolution layer, based on the output of the dilated convolution layer; and
   performing an object detection based on at least one of the output of the dilated convolution layer or the output of the second pooling layer;
   determining an output of a further dilated convolution layer, provided directly after the second pooling layer, based on the output of the second pooling layer;

determining an output of a further pooling layer, provided directly after the further dilated convolution layer, based on the output of the further dilated convolution layer, wherein the object detection is performed further based on at least one of the output of the further dilated convolution layer or the output of the further pooling layer;

up-sampling the output of the dilated convolution layer and the output of the further dilated convolution layer to a pre-determined resolution; and concatenating the output of the dilated convolution layer and the output of the further dilated convolution layer, wherein the object detection is performed further based on the concatenated output.

2. The method of claim 1, wherein a dilation rate of a kernel of the dilated convolution layer is different from a dilation rate of a kernel of the further dilated convolution layer.

3. The method of claim 1, wherein each of the first pooling layer and the second pooling layer comprises either mean pooling or max pooling.

4. The method of claim 1, wherein a respective kernel of each of the first pooling layer and the second pooling layer is of size 2×2, 3×3, 4×4 or 5×5.

5. The method of claim 1, wherein a respective kernel of each of the first pooling layer and the second pooling layer depends on a size of a kernel of the dilated convolution layer.

6. The method of claim 1, wherein the input data comprises a 2D grid with channels.

7. The method of claim 1, wherein the input data is determined based on data from a radar system.

8. The method of claim 1, wherein the input data is determined based on at least one of data from at least one of a LIDAR system or data from a camera system.

9. The method of claim 1, wherein the object detection is performed using a detection head.

10. The method of claim 9, wherein the detection head comprises an artificial neural network.

11. A system comprising:
a processor configured to:
determine an output of a first pooling layer based on input data;
determine an output of a dilated convolution layer, provided directly after the first pooling layer, based on the output of the first pooling layer;
determine an output of a second pooling layer, provided directly after the dilated convolution layer, based on the output of the dilated convolution layer;
perform an object detection based on at least one of the output of the dilated convolution layer or the output of the second pooling layer;
determine an output of a further dilated convolution layer, provided directly after the second pooling layer, based on the output of the second pooling layer;
determine an output of a further pooling layer, provided directly after the further dilated convolution layer, based on the output of the further dilated convolution layer,
wherein the object detection is performed further based on at least one of the output of the further dilated convolution layer or the output of the further pooling layer;
up-sample the output of the dilated convolution layer and the output of the further dilated convolution layer to a pre-determined resolution; and
concatenate the output of the dilated convolution layer and the output of the further dilated convolution layer,
wherein the object detection is performed further based on the concatenated output.

12. The system of claim 11, wherein a respective kernel of each of the first pooling layer and the second pooling layer depends on a size of a kernel of the dilated convolution layer.

13. The system of claim 11, wherein the input data is determined based on data from a radar system.

14. The system of claim 11, wherein the input data is determined based on at least one of data from at least one of a LIDAR system or data from a camera system.

15. The system of claim 11, wherein the object detection is performed using a detection head comprising an artificial neural network.

16. A non-transitory computer readable medium comprising instructions that, when executed, instruct a processor to:
determine an output of a first pooling layer based on input data;
determine an output of a dilated convolution layer, provided directly after the first pooling layer, based on the output of the first pooling layer;
determine an output of a second pooling layer, provided directly after the dilated convolution layer, based on the output of the dilated convolution layer;
perform an object detection based on at least one of the output of the dilated convolution layer or the output of the second pooling layer;
determine an output of a further dilated convolution layer, provided directly after the second pooling layer, based on the output of the second pooling layer;
determine an output of a further pooling layer, provided directly after the further dilated convolution layer, based on the output of the further dilated convolution layer,
wherein the object detection is performed further based on at least one of the output of the further dilated convolution layer or the output of the further pooling layer;
up-sample the output of the dilated convolution layer and the output of the further dilated convolution layer to a pre-determined resolution; and
concatenate the output of the dilated convolution layer and the output of the further dilated convolution layer,
wherein the object detection is performed further based on the concatenated output.

* * * * *